Dec. 12, 1933.                M. H. ROBERTS                1,939,277
                    BOOSTER MOTOR CONTROLLING MECHANISM
                Original Filed April 25, 1931    3 Sheets-Sheet 1

INVENTOR
M. H. Roberts
BY
Synnestvedt Lechner
ATTORNEYS

Dec. 12, 1933.   M. H. ROBERTS   1,939,277
BOOSTER MOTOR CONTROLLING MECHANISM
Original Filed April 25, 1931   3 Sheets-Sheet 3

INVENTOR
M. H. Roberts
BY
Synnestvedt Lechner
ATTORNEYS

Patented Dec. 12, 1933

1,939,277

UNITED STATES PATENT OFFICE 1,939,277

BOOSTER MOTOR CONTROLLING MECHANISM

Montague H. Roberts, Englewood, N. J., assignor to Franklin Railway Supply Company, New York, N. Y., a corporation of Delaware Application April 25, 1931, Serial No. 532,776
Renewed January 10, 1933

13 Claims. (Cl. 105—48)

The present invention relates to a controlling system for a locomotive booster motor and is particularly concerned with that type of locomotive booster equipment in which the steam for operating the booster is supplied to the booster through a pipe which is connected to the steam supply means for the cylinders of the locomotive. In arrangements of this kind it is, of course, clear that the supply of steam for the booster motor is subject to the control of the main locomotive throttle. In instances, therefore, where the main locomotive throttle is closed, as for example, when the main drivers slip, the supply of operating steam to the booster will be cut off.

In order to fully appreciate and understand the nature of the present invention it is necessary, at this point, to call attention to certain characteristics of booster motor equipment as at present in use in the art.

Booster motors are arranged to drive wheels of considerably smaller diameter than the main driving wheels and, since the booster engine is of comparatively small size, it is important to disconnect it from the axle which it drives after the locomotive has attained a certain predetermined speed. If this were not done, the excessive speeds at which the booster motor parts would reciprocate might very well result in completely destroying the booster equipment, if not entirely wrecking the train.

Means for entraining and disentraining the booster motor are, therefore, customary in this art and such means include a gear fixed to the axle to be driven by the booster and an idler gear normally in mesh with a pinion which is mounted on the booster crankshaft, said idler being mounted so as to be moved into and out of mesh with the axle gear. A small cylinder and piston motor is provided for moving the idler gear into mesh with the axle gear.

As is also well known in the art, the control of the booster motor has been subordinated to the control of the main locomotive so that as little additional burden as possible is placed upon the engineer. The arrangement is such that simply by moving the small handle known as the booster latch, the engineer can place the booster system in operation so that when starting the locomotive, or during slow operation say up to approximately twenty-five miles per hour, the booster will automatically function as a driving factor. Beyond this point the booster mechanism is so arranged as to disentrain the booster gears and shut off the supply of steam to the booster cylinders.

There are certain conditions, however, which occur in the operation of the train when it is desirable to keep the booster gears in mesh, even though the supply of steam to the main locomotive may be shut off, for some reason or other. Such conditions arise, for example, when the engineer closes his throttle in order to stop slipping of the main drivers during a difficult start, or when he desires to drift over a turn-out or up to a signal at comparatively slow speed. Under circumstances such as these, the effect of the motion of the locomotive is to throw the idler gear out of mesh with the axle gear because the booster cylinders are exerting no substantial torque and in the absence of positive torque the motion of the axle gear will throw the idler gear out of mesh. However, just as soon as it is thrown out of mesh, the booster entraining mechanism will function to again throw the idler gear toward its meshed position and since the booster cylinders are not in operation because of the fact that the steam supply is shut off, the relative speeds of the entraining gearing will not be such as to permit the idler gear to mesh with the axle gear. As a consequence, clashing will occur, and should the idler gear finally work its way into proper mesh with the axle gear, the axle gear would again throw the idler gear out of mesh and a constant chattering would be the result, which is extremely hard on the gears as well as somewhat dangerous to the safety of the train.

With the foregoing in mind, the objects of my invention will be more clearly understood and they may be said to include: (1) The provision of means whereby it is possible to maintain sufficient torque on the booster gears so that they will remain in mesh up to certain predetermined speeds of the locomotive even under conditions where the full supply of operating steam to the booster motor may be cut off, or so reduced as to prevent the development of proper torque; (2) the provision of a supplemental means for supplying a booster motor with steam in sufficient quantity to maintain torque as above described, at times when the steam supply to the main locomotive is shut off; and (3) the provision of means for closing the customary booster throttle under circumstances such as described in the previous object.

The foregoing, together with such other objects as may appear hereinafter or are incident to my invention, are obtained by means of the equipment which is illustrated in a preferred form in the accompanying drawings, wherein—

Figure 6:
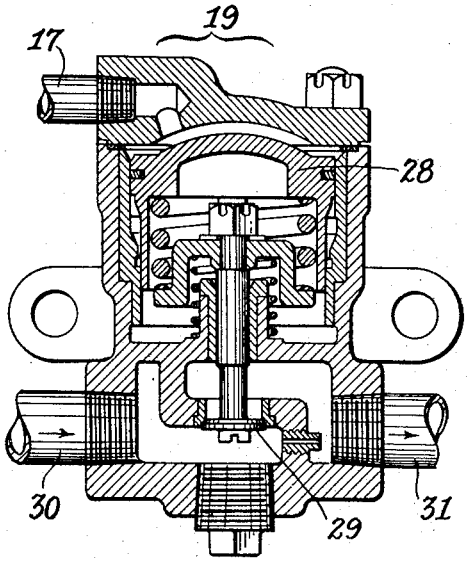
Figure 7:
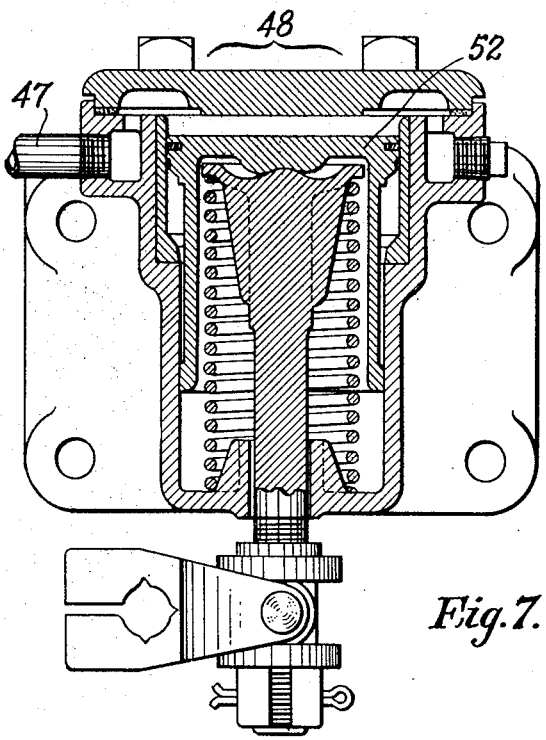

Figure 6 is an enlarged section through the type of motor device which I prefer to use for operating the customary preliminary control valve, as well as the valve which controls the supply of steam to the booster motor which serves to create the necessary torque for maintaining the gears in mesh in accordance with the present invention; and Figure 7 is an enlarged section of the fluid actuated motor device for operating the customary booster throttle valve.

Figure 1:
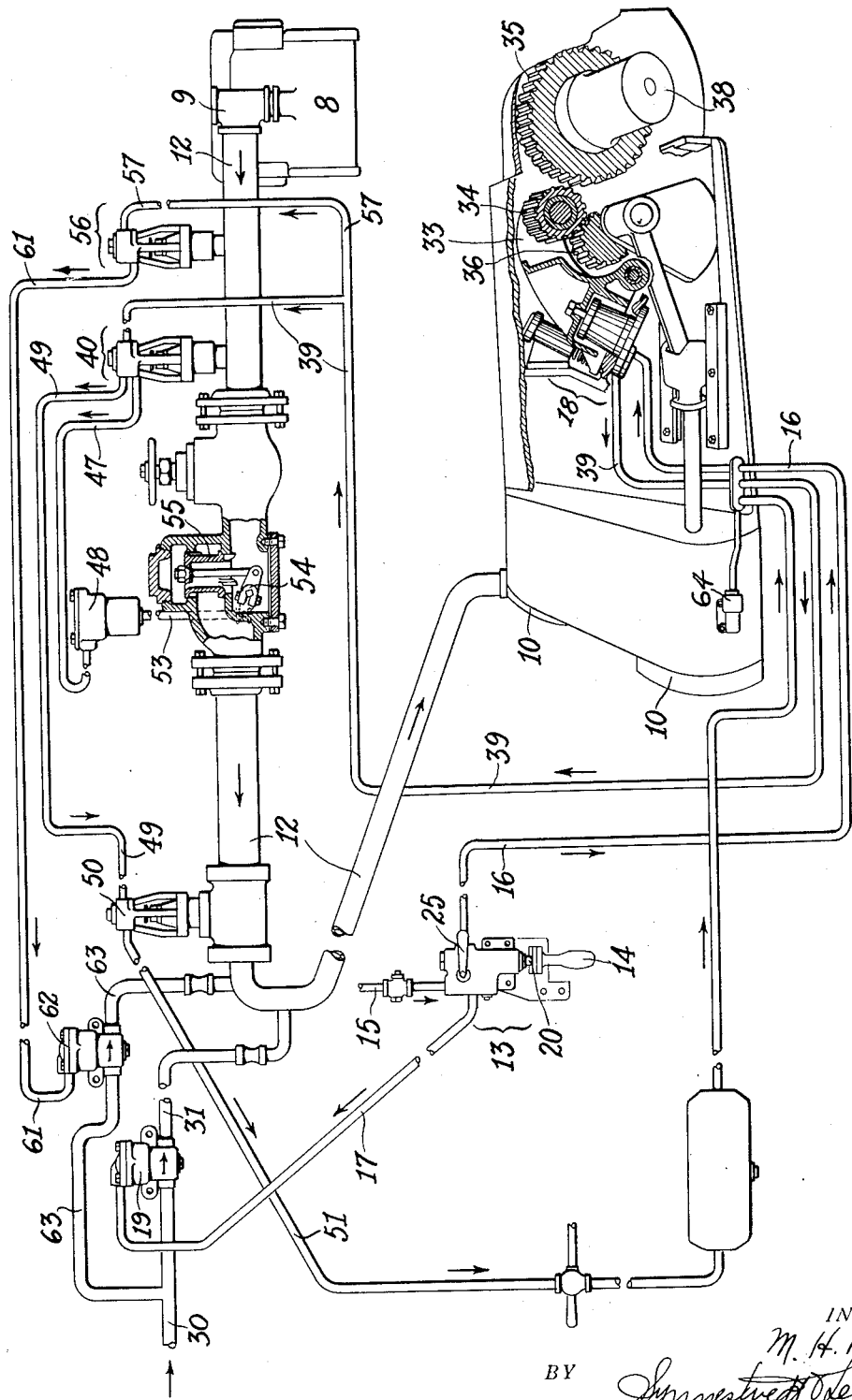
Figure 1 is a diagram of a booster controlling mechanism embodying my improvements.
Figure 2:
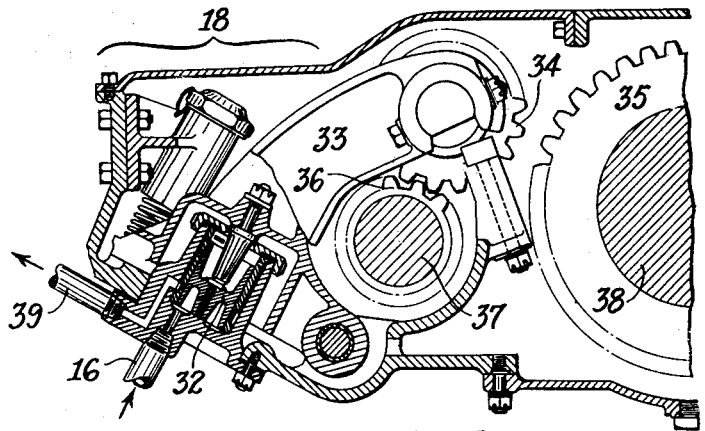
Figure 2 is an enlarged view of the entraining mechanism with the entraining motor illustrated in section.

Referring to the drawings and particularly, in the first instance to Figure 1, it will be seen that I have shown one of the locomotive cylinders 8, which is supplied with steam in the usual way through the steam pipe 9 under the control of the locomotive throttle, not shown, but which is well known to all those familiar with this art.

The cylinders 10 of the booster motor are supplied with steam through the supply line or pipe 12 which is connected, as shown, to the supply means 9 for the locomotive cylinders 8, the flow of the steam taking place in the direction indicated by the arrows in the pipe 12.

When it is desired to place the booster in operation, the reverse lever pilot valve 13 is actuated by means of the latch 14 to permit air pressure coming in from the reservoir through the pipe 15 to reach the pipes 16 and 17, the former of which goes to the entraining motor 18 and the latter of which to the customary preliminary throttle valve 19, the direction of the flow of the air being indicated by the arrows.

Figure 5:
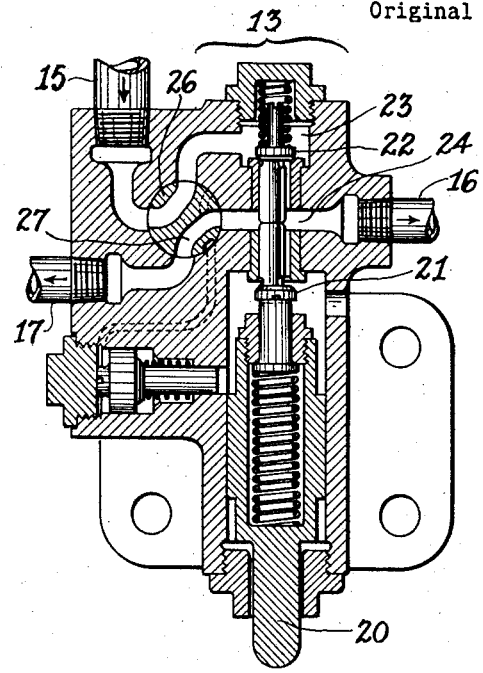
Figure 5 is an enlarged detail view illustrating the principal features of the construction of what is known as the reverse lever pilot valve for a booster controlling system of the character herein disclosed.

This operation is now well known in this art but reference may be had to Figure 5 for a detail showing of the manner in which the air travels from the pipe 15 to the pipes 16 and 17. The latch 14 presses against the plunger 20 and closes the valve 21 while opening the valve 22, so that the air coming in through the pipe 15 can pass from the chamber 23 into the chamber 24 and from thence into the pipes 16 and 17, as clearly shown in Figure 5.

When it is desired to idle the booster motor, the handle 25 may be turned so as to rotate the plug valve 26 to a position where it will directly connect the pipe 15 with the pipe 17 through the channel 27. This will permit air to reach the preliminary throttle valve 19, shown in detail at Figure 6. When the pressure reaches the piston 28 in the preliminary throttle valve, it will force the said piston downwardly in order to open the valve 29 and thereby permit steam to flow from the pipe 30 to the pipe 31, which leads to the steam supply pipe 12 going to the booster, the direction of flow again being indicated by the arrows.

When the air pressure reaches the entraining motor 18, it raises the piston 32 and rocks the member 33 to the right in order to mesh the idler gear 34 with the axle gear 35, the idler gear being at all times in mesh with the booster driving pinion 36 mounted upon the booster crankshaft 37. The axle gear 35 is, of course, fixed to the axle 38, which axle is the one to be driven by the locomotive booster.

After entrainment has taken place, the air passes out from the entraining motor 18 through the pipe 39, which delivers to the pilot mechanism indicated as a whole by the reference character 40. Here the air is blocked by means of the valve 41, which is seen to best advantage in Figure 3. The lower portion of the pilot mechanism is connected to the booster steam pipe 12 so that the piston 42 is subject to the control of the pressure of steam in the pipe 12, the steam entering the pilot device through the passage 43.

Whenever the pressure in the steam pipe 12 is above a predetermined point which, of course, can be regulated as desired by varying the tension of the springs 44 and 45, the piston 42 will be moved upwardly so as to close valve 46, controlling exhaust, and opening valve 41. In this way air will travel from pipe 39 over to pipe 47, which leads to the booster throttle operating motor or cylinder 48 shown in detail in Figure 7.

Figures 3, 4:
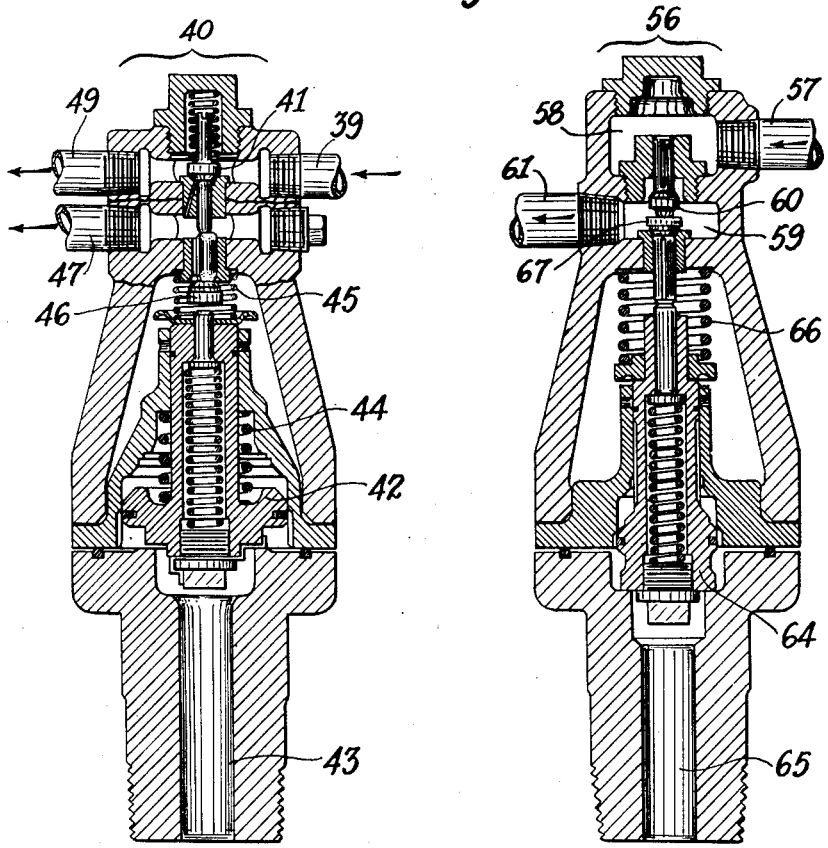
Figure 3 is an enlarged view, partly in section, illustrating one of the pilot mechanisms used in my invention.
Figure 4 is an enlarged view, also partly in section, illustrating another of the pilot mechanisms used in my invention.

As will be seen upon inspection of Figure 3, the air coming in through pipe 39 is also free to pass out through pipe 49 to a similar pilot device 50 which controls the air going through pipe 51, the latter being connected to the cylinder cock controlling mechanism used in this art but not illustrated in detail in the present case because it forms no part of the present invention and need not be described in order to fully appreciate and understand the invention claimed herein.

By referring to Figure 7 it will be seen that the air coming in through the pipe 47 will depress the piston 52, which is connected by means of the rod 53 (shown in Figure 1) to a suitable lever mechanism 54 for raising and opening the booster throttle valve 55.

Air pressure coming from the entraining motor 18 through the pipe 39 is also delivered to the pilot device 56 through the pipe 57, the air entering the chamber 58 out of which it passes to the chamber 59 under the control of the valve 60. The chamber 59 is connected to the pipe 61 which leads to the motor device 62, the details of which are identical with the motor device 19.

The motor device 62 controls a valve (similar in all respects to the valve 19 illustrated in Figure 6) for opening and closing the steam pipe 63 which receives steam from some independent source, preferably the same source which is used for supplying the preliminary valve 19. The pipe 63 delivers to the booster supply pipe 12.

The pilot device 56 is connected at the bottom to the booster supply pipe 12 and its piston 64 is subject to the pressure of steam in the pipe 12, this pressure being delivered to the piston 64 through the passage 65. Upon examination of Figure 4 it will be seen that in the absence of pressure in the steam pipe 12, the piston 64 will be forced to its lower position by means of the spring 66, so that valve 67 will be closed and valve 60 will be open. The valve 67 controls an exhaust passage and the valve 60, as already described, controls the passage of air from the pipe 57 to the pipe 61. It will be seen, therefore, that when there is no steam pressure in the pipe 12, the pilot device 56 will function to permit air pressure to reach the supplementary steam supply device 62 and the size of the port and of the valve in the device 62 is so arranged as to permit a quantity of steam to pass through the pipe 63 to the booster motor which is sufficient to maintain torque upon the gears 34, 35 and 36 so that the axle gear 35 will not throw the idler gear 34 out of mesh.

In this connection it will be understood, of course, that under ordinary circumstances the steam which is delivered to the booster motor through the preliminary throttle valve 19 is not adequate for the creation of torque sufficient to maintain the idler gear 34 in mesh with the axle gear 35, but with the additional supply coming in through the pipe 63, this end is accomplished.

A summary of the operation of the system may be described as follows:

If for any reason the locomotive throttle is closed such, for example, as will occur when the engineer moves the throttle lever to stop slipping of the main drivers, or when he desires to drift over a turn-out or up to a signal there will, of course, be no steam going through the pipe 9 to the cylinder 8 and the booster supply pipe 12. Without my improvements this condition would almost immediately result in completely draining the booster steam pipe 12 of all of its steam because of the suction effect created by the pistons in the locomotive cylinders 8. With my improvements, however, the pilot means 40 will operate to close the valve 41 and thereby shut off the supply of operating fluid to the booster throttle operating motor 48. The booster throttle 55 will then immediately close so that whatever steam is delivered to the pipe 12 through the supplemental means 19 and 62 will not be drawn or sucked out by the action of the pistons in the locomotive cylinders 8.

At the time time, the absence of pressure in the pipe 12 between the point where it connects to the steam supply 9 and the booster throttle 55 will operate through the pilot device 56 to permit air pressure coming in through the pipe 57 to pass through the pipe 61 over to the supplemental supply device 62. The steam coming in through the pipe 63 will be delivered to the booster cylinders through the pipe 12 and sufficient torque will be created to keep the gears in mesh.

By way of further analysis as to the action which takes place, it is desired to present the following discussion although the assumptions made in this discussion are not to be taken as in any way limiting the invention or the character of its operation because, as will be obvious, the pressures, speeds, etc. used by way of example might vary considerably.

Let us assume that the drawbar pull of the booster illustrated begins at approximately eleven thousand pounds, and that it is desired to throw the booster out of mesh and, therefore, out of operation at a locomotive speed in the neighborhood of twenty-five miles per hour. If idling steam only is delivered to the booster motor through the preliminary throttle valve 19 in a manner which is well understood in this art, the drawbar pull, of course, will drop way down to a negligible factor because it is not intended to develop power with the steam which comes in through the preliminary throttle valve, such steam in fact being only sufficient to idle the booster and clear it of condensation. With the gears out of mesh, such preliminary steam would be sufficient, approximately, to operate the booster parts at a speed which corresponds to a locomotive speed of twenty miles per hour.

Now if the booster system is placed in condition to function and the locomotive is below twenty-five miles per hour but for some reason the locomotive throttle has been closed, the amount of steam coming through the preliminary throttle valve would probably not be sufficient to keep the idler gear in mesh at a locomotive speed greater than fifteen miles per hour. As a consequence, there is a certain range of speed between, say about fifteen miles per hour and twenty-five miles per hour, where the gear, under such circumstances, will come out of mesh and go back into mesh in a jerky fashion with the clashing effect previously mentioned.

However, with my improved supplemental supply means I can arrange to provide a steam pressure in the neighborhood of forty pounds which is sufficient to raise the drawbar pull to a point sufficiently high to prevent the idler gear from coming out of mesh, while at the same time not sufficiently great to materially add to the driving power of the locomotive and, therefore, not sufficient to interfere with the idling or drifting conditions encountered where the present invention is to be used.

It should also be noted that during those times when there is insufficient steam pressure entering the booster pipe 12 from the main supply line 9 the pilot device 40, of course, functions to prevent air pressure from reaching the booster cylinder cock controlling motor 64 as well as the booster throttle operating cylinder 48. Under these circumstances, as is well known in the art, the booster cylinder cocks will be in their open position so that there may be a certain amount of steam blowing out from the cocks but the condition, ordinarily, does not exist for any great length of time so that the loss is not material.

In conclusion, it will be understood, of course, that the two pilot valve mechanisms 40 and 56 function only at times when the air is turned into the booster operating system through the reverse lever pilot valve. In the absence of air pressure in the booster controlling system, these pilot valves are, of course, ineffective insofar as their operative function is concerned, although their pistons may move upwardly and downwardly in accordance with the pressure existing in the pipe 12.

What I claim is:

1. The combination of a locomotive booster, a steam supply line therefor which is subject to the suction effect produced when the locomotive is drifting, a throttle valve in said line, a normally closed supplementary steam supply line for the booster, and means for closing said throttle valve and for opening said supplementary line when the locomotive is drifting 2. The combination of a locomotive booster, a steam supply line therefor which is connected to the steam supply means for the locomotive cylinders, a throttle valve in said line, a normally closed supplementary steam supply line for the booster, and means for closing said throttle and for opening said supplementary line in the absence of pressure in the supply means for the locomotive cylinders.

3. The combination of a locomotive, a locomotive cylinder, a steam supply pipe for the cylinder, an axle, a booster, gearing including a radially shiftable gear for entraining the booster with the axle, a conduit connecting the booster with the steam supply pipe for the cylinder, a throttle valve in said conduit, a motor device for operating said throttle valve, a supplementary steam supply line connected to said conduit between said throttle valve and the booster, a valve normally closing said supplementary line, a motor means for opening said valve, and pilot means subject to the pressure of steam in said conduit at a point in advance of the throttle valve, said pilot means acting to cause said motor device to close the throttle and to cause said motor means to open the valve in the supplemental line upon cessation of steam supply in the pipe which leads to the cylinder.

4. In booster mechanism for locomotives, the combination with a radially shiftable gear for entraining the booster motor, of a steam supply conduit for the booster connected to the steam supply means for the locomotive, a throttle valve in said booster steam supply line, a supplementary steam supply line connected to the booster supply line between said throttle valve and the booster motor, a fluid controlled motor device for opening and closing the booster throttle valve, a shut-off valve in the supplementary line, a second fluid controlled motor device for opening and closing said shut-off valve, a pilot device subject to the pressure of the steam in the booster supply line in advance of the booster throttle, and a second pilot device similarly subject to the pressure of the steam in the booster supply line in advance of the booster throttle, said first pilot device acting to close the booster throttle and said second pilot device acting to open said shut-off valve in the absence of pressure in the supply means for the locomotive.

5. In a booster equipped locomotive, the combination with the steam supply means for the locomotive, of a steam supply line for the booster receiving steam from said locomotive supply means, a throttle valve in the booster supply line, a supplementary steam supply line for the booster, a valve normally closing said supplementary line, and means for opening said valve and for closing said throttle upon substantial cessation of the steam supply to the locomotive.

6. The combination with a shiftable gear for entraining a locomotive booster motor, of a main steam supply line therefor which is connected to the steam supply means for the locomotive cylinders, a throttle valve in said main line, a normally closed supplementary steam supply line for the booster having a capacity which is sufficient to maintain enough torque on the gear to keep it in mesh at locomotive speeds suitable for booster operation, and means for closing said throttle valve and for opening said supplemental line at times when the main steam supply is insufficient to develop the torque required to maintain the gear in mesh.

7. Booster equipment for a locomotive including, in combination with a radially shiftable gear for entraining a locomotive booster motor, a steam supply line for the booster motor which is connected with the main steam supply means for the main engine of the locomotive, throttle means in said supply line, a supplementary steam supply means for the booster motor communicating with said steam supply line at a point beyond the throttle means therein, said supplementary steam supply being of capacity sufficient to maintain driving torque on the gear, and means for opening said supplementary steam supply means in the absence of sufficient pressure in the said supply means for the main engine of the locomotive.

8. Booster equipment for a locomotive including, in combination with a radially shiftable gear for entraining a locomotive booster motor, a steam supply line for the booster motor which is connected with the main steam supply means for the main engine of the locomotive, throttle means in said supply line, a supplementary steam supply means for the booster motor communicating with said steam supply line at a point beyond the throttle means therein, said supplementary steam supply being of capacity sufficient to maintain driving torque on the gear, normally closed valve means in said supplementary steam supply means, and means for opening said valve means in the absence of sufficient pressure in the said supply means for the main engine of the locomotive.

9. Booster equipment for a locomotive including, in combination with the main steam supply means for the main engine of the locomotive, a booster motor adapted to drive an axle, a mechanism providing for entrainment and disentrainment of the motor with respect to the axle, said mechanism being characterized by its arrangement to maintain entrainment under the influence of driving torque, a steam supply line for the booster motor communicating with the main steam supply means for the main engine, a throttle in said booster supply line, auxiliary steam supply means for the booster motor adapted to deliver steam thereto substantially independently of said throttle and being of such capacity as to ensure sufficient torque to maintain entrainment, and control means for the auxiliary steam supply providing for opening thereof under the influence of reduction of the main steam supply to the main engine to a point at which said main steam supply would be insufficient to produce the driving torque necessary to maintain booster entrainment.

10. Booster equipment for a locomotive including, in combination with the main steam supply means for the main engine of the locomotive, a booster motor adapted to drive an axle, a mechanism providing for entrainment and disentrainment of the motor with respect to the axle, said mechanism being characterized by its arrangement to maintain entrainment under the influence of driving torque, a steam supply line for the booster motor communicating with the main steam supply means for the main engine, a throttle in said booster supply line, auxiliary steam supply means for the booster motor adapted to deliver steam thereto substantially independently of said throttle and being of such capacity as to ensure sufficient torque to maintain entrainment, control means for the auxiliary steam supply providing for opening thereof under the influence of reduction of the main steam supply to the main engine to a point at which said main steam supply would be insufficient to produce the driving torque necessary to maintain booster entrainment, and control means for said throttle providing for closure thereof under the influence of reduction of the main steam supply to the main engine to a point at which said main steam supply would be insufficient to produce the driving torque necessary to maintain booster entrainment.

11. Booster equipment for a locomotive including, in combination with the main steam supply means for the main engine of the locomotive, a booster motor adapted to drive an axle, a mechanism providing for entrainment and disentrainment of the motor with respect to the axle, said mechanism being characterized by its arrangement to maintain entrainment under the influence of driving torque, a normal booster steam supply line communicating with the main steam supply means for the main engine, an auxiliary steam supply means for the booster motor, a fluid pressure motor actuated valve in said booster steam supply line, a fluid pressure motor actuated valve in said auxiliary steam supply means, means normally tending to maintain the second mentioned fluid pressure motor actuated valve in closed position, and fluid pressure means in the normal booster steam supply in advance of the first mentioned fluid pressure motor actuated valve operative upon a drop in steam pressure to effect opening of the fluid pressure motor actuated valve in the auxiliary steam supply means for the motor.

12. Booster equipment for a locomotive including, in combination with the main steam supply means for the main engine of the locomotive, a booster motor adapted to drive an axle, a mechanism providing for entrainment and disentrainment of the motor with respect to the axle, said mechanism being characterized by its arrangement to maintain entrainment under the influence of driving torque, a normal booster steam supply line communicating with the main steam supply means for the main engine, an auxiliary steam supply means for the booster motor, valve means for controlling the auxiliary steam supply means, a fluid pressure operable motor device for opening said valve means, and a pilot valve device associated with the normal booster steam supply through the main steam supply to the main engine of the locomotive and through said booster line said device being operative upon a drop in pressure in the normal booster steam supply to effect opening of said valve means in the auxiliary steam supply to the booster motor.

13. Booster equipment for a locomotive including, in combination with the main steam supply means for the main engine of the locomotive, a booster motor adapted to drive an axle, a mechanism providing for entrainment and disentrainment of the motor with respect to the axle, said mechanism being characterized by its arrangement to maintain entrainment under the influence of driving torque, a normal booster steam supply line communicating with the main steam supply means for the main engine, an auxiliary steam supply means for the booster motor, a fluid pressure motor actuated valve in said booster steam supply line, a fluid pressure motor actuated valve in said auxiliary steam supply means, means normally tending to maintain the second mentioned fluid pressure motor actuated valve in closed position, fluid pressure means in the normal booster steam supply in advance of the first mentioned fluid pressure motor actuated valve operative upon a drop in steam pressure to effect opening of the fluid pressure motor actuated valve in the auxiliary steam supply means for the motor, and fluid pressure means in the normal booster steam supply also in advance of the first mentioned fluid pressure motor actuated valve operative upon a drop in steam pressure to effect closure of the fluid pressure motor actuated valve in the normal steam supply to the booster motor.

MONTAGUE H. ROBERTS.